(12) United States Patent
Tatman et al.

(10) Patent No.: US 11,021,962 B2
(45) Date of Patent: Jun. 1, 2021

(54) TURBULENT AIR REDUCER FOR A GAS TURBINE ENGINE

(71) Applicant: United Technologies Corporation, Farmington, CT (US)

(72) Inventors: Neil L. Tatman, Brentwood, NH (US); Nathan K. Galle, Portland, ME (US); Richard K. Hayford, Cape Neddick, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 162 days.

(21) Appl. No.: 16/108,763

(22) Filed: Aug. 22, 2018

(65) Prior Publication Data

US 2020/0063564 A1 Feb. 27, 2020

(51) Int. Cl.
*F01D 5/08* (2006.01)
*F01D 5/10* (2006.01)

(52) U.S. Cl.
CPC .............. *F01D 5/085* (2013.01); *F01D 5/10* (2013.01); *F05D 2240/81* (2013.01); *F05D 2260/31* (2013.01); *F05D 2260/96* (2013.01)

(58) Field of Classification Search
CPC . F01D 5/085; F01D 5/10; F01D 5/082; F01D 5/08; F05D 2260/96; F05D 2260/31; F05D 2240/81; F05D 2260/97; F05D 2260/14
See application file for complete search history.

(56) References Cited

U.S. PATENT DOCUMENTS

| | | | | |
|---|---|---|---|---|
| 4,190,397 | A | * | 2/1980 | Schilling ............... F01D 25/243 415/108 |
| 4,425,079 | A | * | 1/1984 | Speak .................... F01D 5/081 415/115 |
| 4,526,511 | A | * | 7/1985 | Levine .................... F01D 5/081 416/95 |
| 4,659,285 | A | * | 4/1987 | Kalogeros ............. F01D 5/3015 416/220 R |

(Continued)

FOREIGN PATENT DOCUMENTS

| | | | |
|---|---|---|---|
| EP | 1316677 A1 * | 6/2003 | .......... F16J 15/0887 |
| EP | 1369552 A2 * | 12/2003 | ............. F23R 3/343 |

(Continued)

OTHER PUBLICATIONS

Hinkle "An Automated Method for Optimizing Compressor Blade Tuning" (Year: 2016).*

(Continued)

*Primary Examiner* — Ninh H. Nguyen
*Assistant Examiner* — Brian Christopher Delrue
(74) *Attorney, Agent, or Firm* — Bachman & LaPointe, P.C.

(57) ABSTRACT

A turbulent air reducer assembly for a gas turbine engine includes a windage cover attached to a first standoff and a second standoff, the windage cover tuned to a particular vibration response. A method of managing air within a turbine of a gas turbine engine includes reducing turbulence from a multiple of recesses within a tangential on-board injector with a turbulent air reducer assembly within each of the multiple of recesses, the turbulent air reducer assembly tuned to a particular vibration response from a turbine rotor.

8 Claims, 9 Drawing Sheets

(56) References Cited

U.S. PATENT DOCUMENTS

| | | | | |
|---|---|---|---|---|
| 5,090,865 A * | 2/1992 | Ramachandran | F01D 5/066 | 415/112 |
| 5,224,822 A * | 7/1993 | Lenahan | C23C 30/00 | 415/189 |
| 5,259,725 A * | 11/1993 | Hemmelgarn | F01D 11/005 | 29/450 |
| 5,310,319 A * | 5/1994 | Grant | F01D 5/082 | 416/220 R |
| 5,313,786 A * | 5/1994 | Chlus | F01D 5/22 | 415/119 |
| 5,402,636 A * | 4/1995 | Mize | F01D 3/00 | 60/806 |
| 5,415,063 A * | 5/1995 | Honlinger | F16H 55/36 | 181/207 |
| 5,522,698 A * | 6/1996 | Butler | F01D 11/001 | 277/355 |
| 5,597,167 A * | 1/1997 | Snyder | F01D 11/00 | 277/355 |
| 5,645,397 A * | 7/1997 | Soechting | F01D 5/187 | 415/115 |
| 5,800,124 A * | 9/1998 | Zelesky | F01D 5/3015 | 416/95 |
| 5,988,982 A * | 11/1999 | Clauer | C21D 10/005 | 416/241 R |
| 6,325,603 B1 * | 12/2001 | Moller | F01C 21/06 | 418/86 |
| 6,462,308 B1 * | 10/2002 | Lahrman | B23K 26/03 | 219/121.83 |
| 6,499,945 B1 * | 12/2002 | Lathrop | F01D 5/3015 | 416/198 A |
| 6,542,859 B1 * | 4/2003 | Burns | G06F 30/23 | 703/7 |
| 6,558,114 B1 * | 5/2003 | Tapley | F01D 5/081 | 415/111 |
| 6,761,034 B2 * | 7/2004 | Niday | F01D 5/08 | 415/171.1 |
| 6,787,947 B2 * | 9/2004 | Coulon | F01D 5/081 | 310/52 |
| 7,025,562 B2 * | 4/2006 | Imbourg | F01D 5/082 | 415/115 |
| 7,048,497 B2 * | 5/2006 | Arilla | F01D 5/081 | 415/116 |
| 7,094,020 B2 * | 8/2006 | Dong | F01D 11/001 | 415/112 |
| 7,249,463 B2 * | 7/2007 | Anderson | F01D 25/243 | 60/798 |
| 7,341,429 B2 | 3/2008 | Montgomery et al. | | |
| 7,445,424 B1 * | 11/2008 | Ebert | F01D 5/081 | 415/113 |
| 7,614,845 B2 * | 11/2009 | Adam | F01D 25/246 | 415/134 |
| 7,630,869 B2 * | 12/2009 | Shen | G01H 1/003 | 703/6 |
| 7,635,251 B2 * | 12/2009 | Duesler | F01D 11/001 | 415/173.7 |
| 7,704,038 B2 * | 4/2010 | Ring | F01D 25/14 | 415/112 |
| 8,328,519 B2 * | 12/2012 | Denis | F01D 5/027 | 29/889 |
| 8,381,533 B2 * | 2/2013 | Smoke | F01D 5/081 | 415/115 |
| 8,459,941 B2 * | 6/2013 | Jasko | F01D 9/041 | 415/190 |
| 9,410,436 B2 * | 8/2016 | Kulathu | F01D 5/10 | |
| 10,294,808 B2 * | 5/2019 | Simonds | F01D 25/243 | |
| 10,458,436 B2 * | 10/2019 | Theratil | F01D 5/141 | |
| 10,494,936 B2 * | 12/2019 | Biolsi | F01D 9/041 | |
| 10,788,049 B1 * | 9/2020 | Edwards | F04D 29/544 | |
| 2003/0226362 A1 * | 12/2003 | Niday | F01D 5/08 | 60/796 |
| 2004/0026869 A1 * | 2/2004 | Addis | F16J 15/002 | 277/355 |
| 2006/0053768 A1 * | 3/2006 | Anderson | F01D 25/243 | 60/226.1 |
| 2007/0059158 A1 * | 3/2007 | Alvanos | F02C 7/18 | 415/115 |
| 2007/0110565 A1 * | 5/2007 | Montgomery | F01D 5/082 | 415/115 |
| 2007/0286719 A1 * | 12/2007 | Duesler | F01D 11/001 | 415/191 |
| 2008/0241546 A1 * | 10/2008 | McClain | C21D 10/005 | 428/409 |
| 2009/0259076 A1 * | 10/2009 | Simmons | C07C 1/20 | 568/671 |
| 2010/0074752 A1 * | 3/2010 | Denis | F01D 5/027 | 416/144 |
| 2012/0257958 A1 * | 10/2012 | Norton | F01D 5/025 | 415/108 |
| 2016/0160688 A1 * | 6/2016 | Bailey | F01D 5/066 | 415/173.7 |
| 2016/0168999 A1 * | 6/2016 | Takabatake | F01D 5/147 | 416/223 A |
| 2016/0201491 A1 * | 7/2016 | Surace | F01D 9/065 | 415/1 |
| 2016/0258292 A1 * | 9/2016 | Kondo | F01D 5/066 | |
| 2017/0096939 A1 * | 4/2017 | Mueller | F01D 25/12 | |
| 2017/0159445 A1 * | 6/2017 | Hayford | F01D 5/022 | |
| 2017/0292393 A1 * | 10/2017 | Anastas | F01D 5/082 | |
| 2017/0306776 A1 * | 10/2017 | Simonds | F16B 37/14 | |
| 2018/0058329 A1 * | 3/2018 | Stevens | F01D 5/082 | |
| 2018/0223683 A1 * | 8/2018 | Tham | F01D 11/02 | |
| 2019/0120255 A1 * | 4/2019 | Tomeo | F01D 5/10 | |
| 2020/0063564 A1 * | 2/2020 | Tatman | F01D 5/10 | |

FOREIGN PATENT DOCUMENTS

| | | | | |
|---|---|---|---|---|
| EP | 1764484 A2 * | 3/2007 | | F01D 5/081 |
| EP | 1764484 A2 | 3/2007 | | |
| WO | 9530071 A1 | 11/1995 | | |
| WO | WO-2014046927 A1 * | 3/2014 | | F01D 5/225 |

OTHER PUBLICATIONS

Mohan et al "Vibration analysis of a steam turbine blade" (Year: 2014).*

EP Search Report dated Dec. 12, 2019 issued for corresponding European Patent Application No. 19181504.2.

Extended EP Search Report dated Mar. 13, 2020 issued for corresponding European Patent Application No. 19181504.2.

* cited by examiner

TURBULENT AIR REDUCER FOR A GAS TURBINE ENGINE

STATEMENT REGARDING FEDERALLY SPONSORED RESEARCH OR DEVELOPMENT

This invention was made with Government support awarded by the United States. The Government has certain rights in this invention.

BACKGROUND

The present disclosure relates to a gas turbine engine and, more particularly, to reduction of turbulent air at an interface between a static reference frame and a rotating reference frame.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases. The hot gases expanded within the turbine section produce a gas stream across alternating rows of stationary turbine stator vanes and rotating turbine rotor blades produce power.

Internal secondary flow systems transfer cooling air that bypasses the combustor section to a turbine rotor assembly for subsequent distribution to the interior of the rotor blades through an on-board injector. Accelerating the cooling air through a nozzle and swirling the air with the rotation of the turbine rotor, reduces the temperature of the cooling air as it is injected on board the turbine rotor.

Various cast features within the engine are exposed to this air flow downstream of the on-board injector. The rotating air interacts with the cast features which increases air turbulence and the air temperature. The net result is that the air flowing to the interior of the rotor blades may be relatively hotter and thereby relatively less thermally efficient.

SUMMARY

A turbulent air reducer assembly for a gas turbine engine according to one disclosed non-limiting embodiment of the present disclosure includes a windage cover attached to a first standoff and a second standoff, the windage cover tuned for a particular vibration response.

A further embodiment of any of the foregoing embodiments of the present disclosure includes a fastener received within each of the first standoff and the second standoff.

A further embodiment of any of the foregoing embodiments of the present disclosure includes that the fastener is recessed within each of the first standoff and the second standoff.

A further embodiment of any of the foregoing embodiments of the present disclosure includes that the fastener retains a first component to a second component.

A further embodiment of any of the foregoing embodiments of the present disclosure includes that the first component is a cast component.

A further embodiment of any of the foregoing embodiments of the present disclosure includes that the first component is a tangential on board injector.

A further embodiment of any of the foregoing embodiments of the present disclosure includes that the second component is a vane support.

A further embodiment of any of the foregoing embodiments of the present disclosure includes that the windage cover is received within a recess formed in the tangential on-board injector.

A further embodiment of any of the foregoing embodiments of the present disclosure includes that the particular vibration response is related to a rotation of a turbine rotor.

An assembly for a gas turbine engine according to one disclosed non-limiting embodiment of the present disclosure includes an on-board injector with a multiple of recesses; and a turbulent air reducer assembly within each of the multiple of recesses.

A further embodiment of any of the foregoing embodiments of the present disclosure includes that the turbulent air reducer assembly is tuned to a particular vibration response.

A further embodiment of any of the foregoing embodiments of the present disclosure includes that the particular vibration response is related to a rotation of a turbine rotor.

A further embodiment of any of the foregoing embodiments of the present disclosure includes a fastener at least partially within the turbulent air reducer assembly.

A further embodiment of any of the foregoing embodiments of the present disclosure includes a fastener at least partially recessed within the turbulent air reducer assembly.

A further embodiment of any of the foregoing embodiments of the present disclosure includes that the fastener attaches the on-board injector to a vane support.

A further embodiment of any of the foregoing embodiments of the present disclosure includes that the turbulent air reducer assembly according to one disclosed non-limiting embodiment of the present disclosure includes a windage cover attached to a first standoff and a second standoff, the windage cover tuned for a particular vibration response.

A further embodiment of any of the foregoing embodiments of the present disclosure includes that the first standoff and the second standoff comprise a flange attached to the windage cover, and a fastener recessed within the respective first and second standoff.

A further embodiment of any of the foregoing embodiments of the present disclosure includes that the first standoff and the second standoff abut a machined surface on the tangential on-board injector within each of the multiple of recesses, and the tangential on-board injector is a cast component.

A method for vibration tuning a component within a section of a gas turbine engine according to one disclosed non-limiting embodiment of the present disclosure includes removing an overhung mass from a windage cover to tune the component to a particular vibration response.

A further embodiment of any of the foregoing embodiments of the present disclosure determines vibration from a turbine rotor.

A further embodiment of any of the foregoing embodiments of the present disclosure includes removing the overhung mass comprises thinning a semi-circular area.

A further embodiment of any of the foregoing embodiments of the present disclosure includes thinning the semi-circular area comprises thinning the semi-circular area with a standard tool.

A further embodiment of any of the foregoing embodiments of the present disclosure includes removing the overhung mass comprises removing mass near a free edge.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
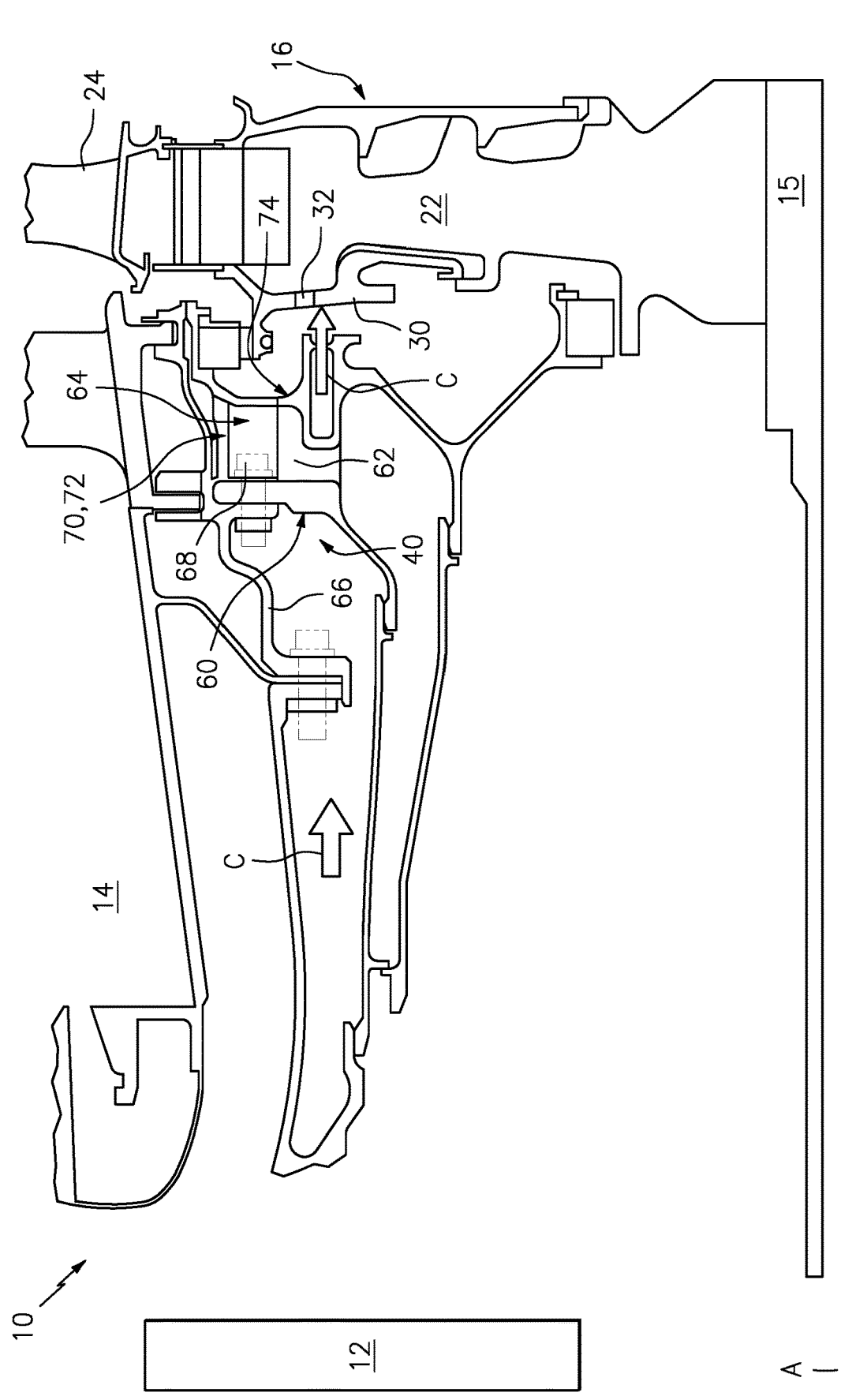
FIG. 1 is a fragmentary axial cross section of a portion of the turbine section of a gas turbine engine showing a tangential on-board injector (TOBI) nozzle for the distribution of cooling air with turbulent air reducer assemblies.

FIG. 1 schematically illustrates a portion of a gas turbine engine 10. Although depicted as a turbofan in the disclosed non-limiting embodiment, it should be appreciated that the concepts described herein are not limited to use with turbofans as the teachings may be applied to other types of turbo machines.

The gas turbine engine 10 generally includes a compressor section 12 and a turbine section 16 mounted along a rotor shaft 15 to form a spool that rotates about an engine longitudinal axis A. In this disclosed non-limiting embodiment, the turbine section 16 is a high pressure turbine. A turbine 20 with a turbine rotor 22 that supports a multiple of rotor blades 24 is mounted on the shaft 15. The blades 24 receive and expand the combustion products from the combustor 14. Cooling air C flow such as bleed air from the compressor section 12 is directed to the turbine section 16 through a series of passages.

An on-board injector assembly 40 (also shown in FIG. 2) which, in this disclosed non-limiting embodiment, is a tangential on-board injector (TOBI). The on-board injector assembly 40 surrounds the engine longitudinal axis A and directs the cooling air C toward the turbine rotor 22 for cooling. A cover plate 30 separates the on-board injector assembly 40 and the turbine rotor 22. A multiple of cover plate apertures 32 are provided in the cover plate 30 to direct cooling air C from the on-board injector assembly 40 into the turbine rotor 22, thence into the rotor blades 24.

Figure 2:
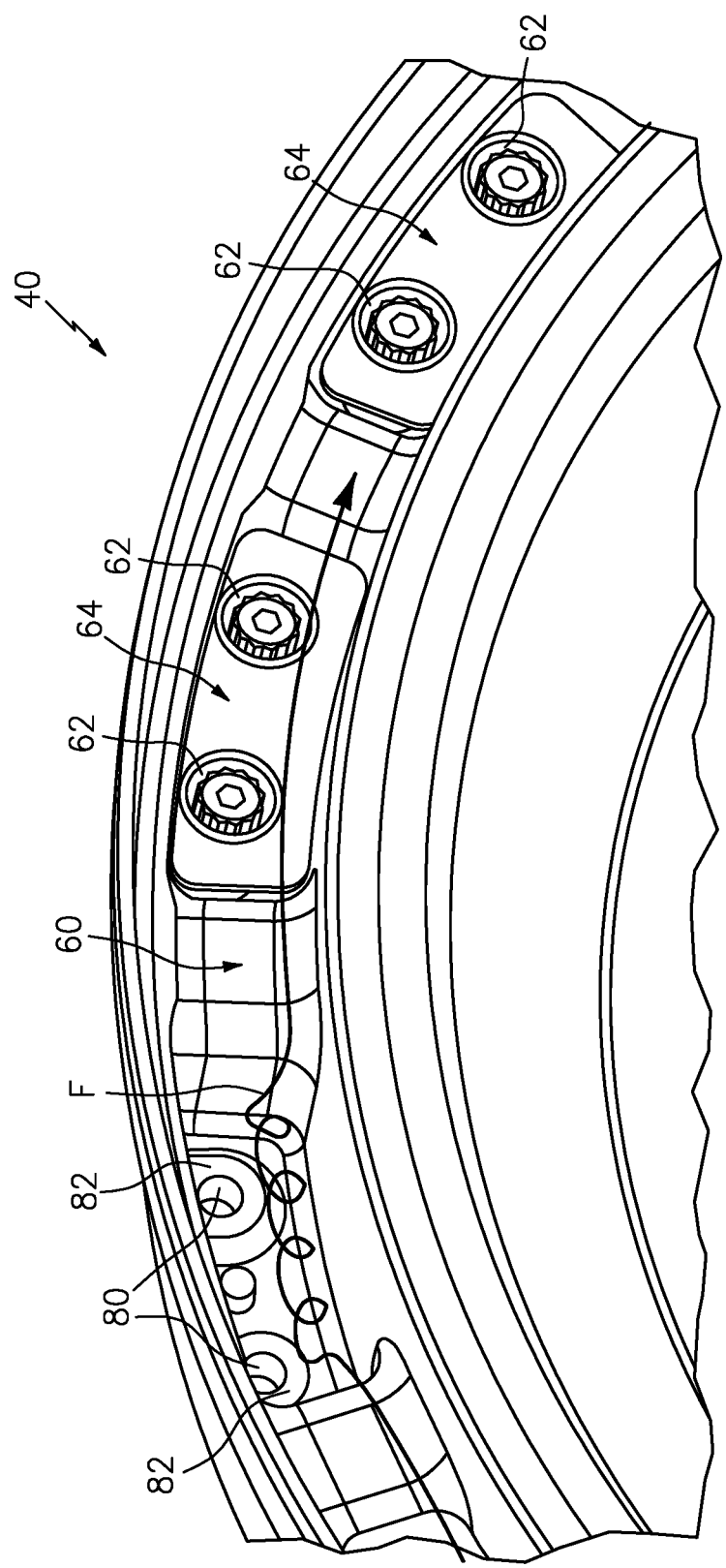
FIG. 2 is an enlarged perspective view of the tangential on-board injector (TOBI) with the turbulent air reducer assemblies.

The on-board injector assembly 40 generally includes an on-board injector 60 with a multiple of recesses 62, and a turbulent air reducer assembly 64 within each of the multiple of recesses 62 (also shown in FIG. 2). The on-board injector 60 is typically a cast component with the multiple of recesses 62 cast therein. Tolerances typical of castings need to be accommodated by the turbulent air reducer assembly 64 which is mounted thereto. In one embodiment, the on-board injector 60 is a circular cast component with sixteen (16) recesses 62. Each of the multiple of recesses 62 includes an aperture 80 through a machined surface 82 (FIG. 2).

The on-board injector 60 is attached to a vane support 66 with fasteners 68 that are received within, and partially recessed, within a turbulent air reducer assembly 64. Turbulent air reducer assemblies 64 create a smoother overall series of surfaces for rotating air flow F (FIG. 2) to pass thereby than if just the on-board injector 60 is exposed. The turbulent air reducer assembly 64 provides a smoother series of surfaces that reduce air turbulence and temperature. This therefore increases efficiency of the turbine section 16 with negligible vibratory response.

Figure 3:
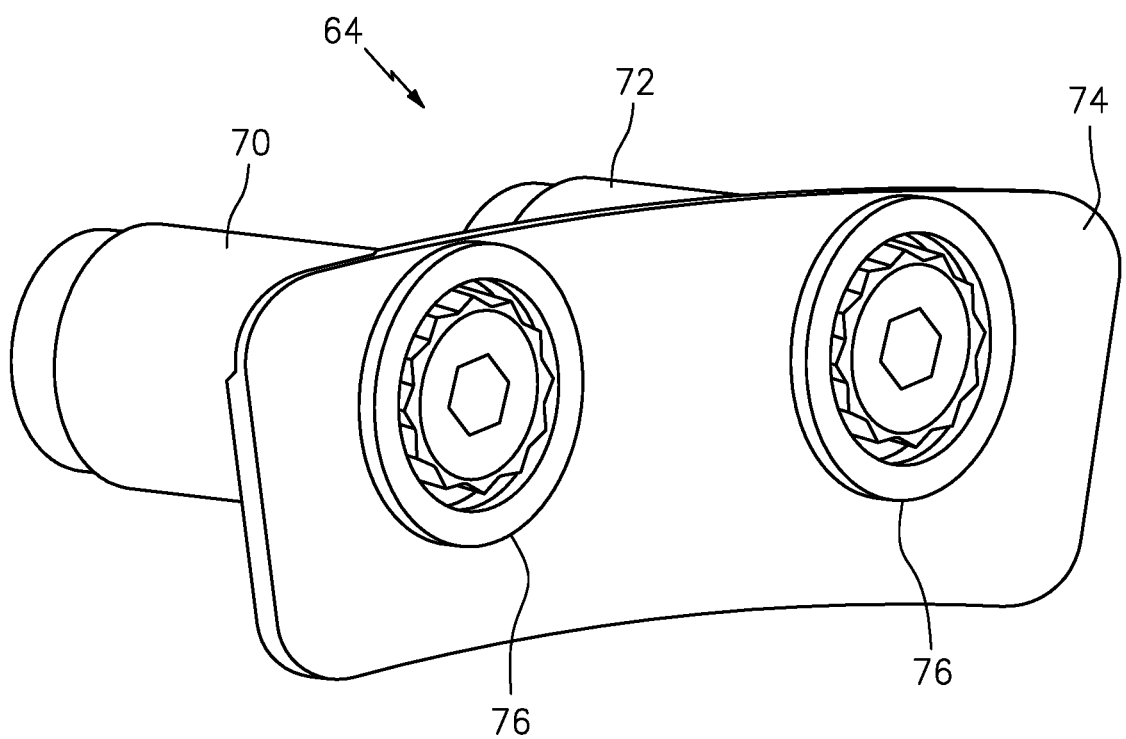
FIG. 3 is an aft perspective view of the turbulent air reducer assembly according to one disclosed non-limiting embodiment.
Figure 4:
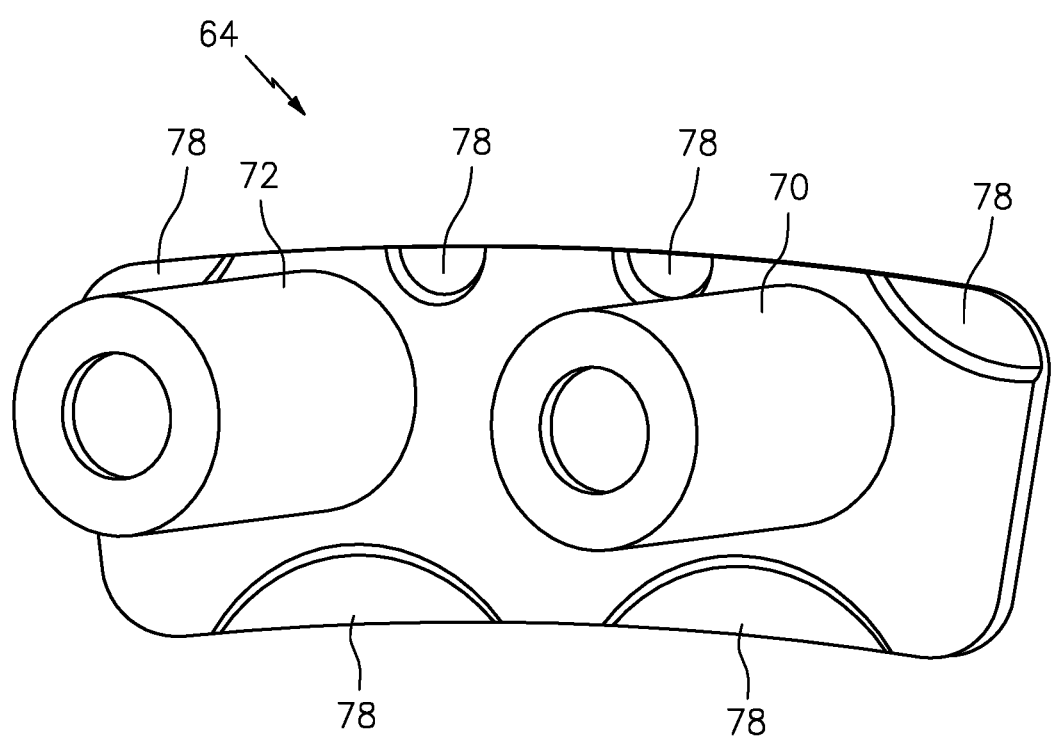
FIG. 4 is a front perspective view of the turbulent air reducer assembly according to one disclosed non-limiting embodiment.

The turbulent air reducer assembly 64 generally includes a first standoff 70, a second standoff 72, and a windage cover 74 attached to the first standoff 70 and the second standoff 72 (also shown in FIG. 3). The windage cover 74 can be tuned to a particular vibration response via vibe tune features 78 (FIG. 4). The first standoff 70 and the second standoff 72 are cylindrical members to receive the fasteners 68 that attach the on-board injector 60 to the vane support 66. The first standoff 70 and the second standoff 72 abut the machined surface 82.

With reference to FIG. 3, in one embodiment, the first standoff 70 and the second standoff 72 each include a respective flange 76 that is attached to an aft side (directed toward the aft end of the engine with respect to the engine longitudinal axis A) of the windage cover 74 via, for example, welding. The vibe tune features 78 may be located on a forward side (FIG. 4; directed toward the front end of the engine with respect to the engine longitudinal axis A) of the windage cover 74.

Figure 5:
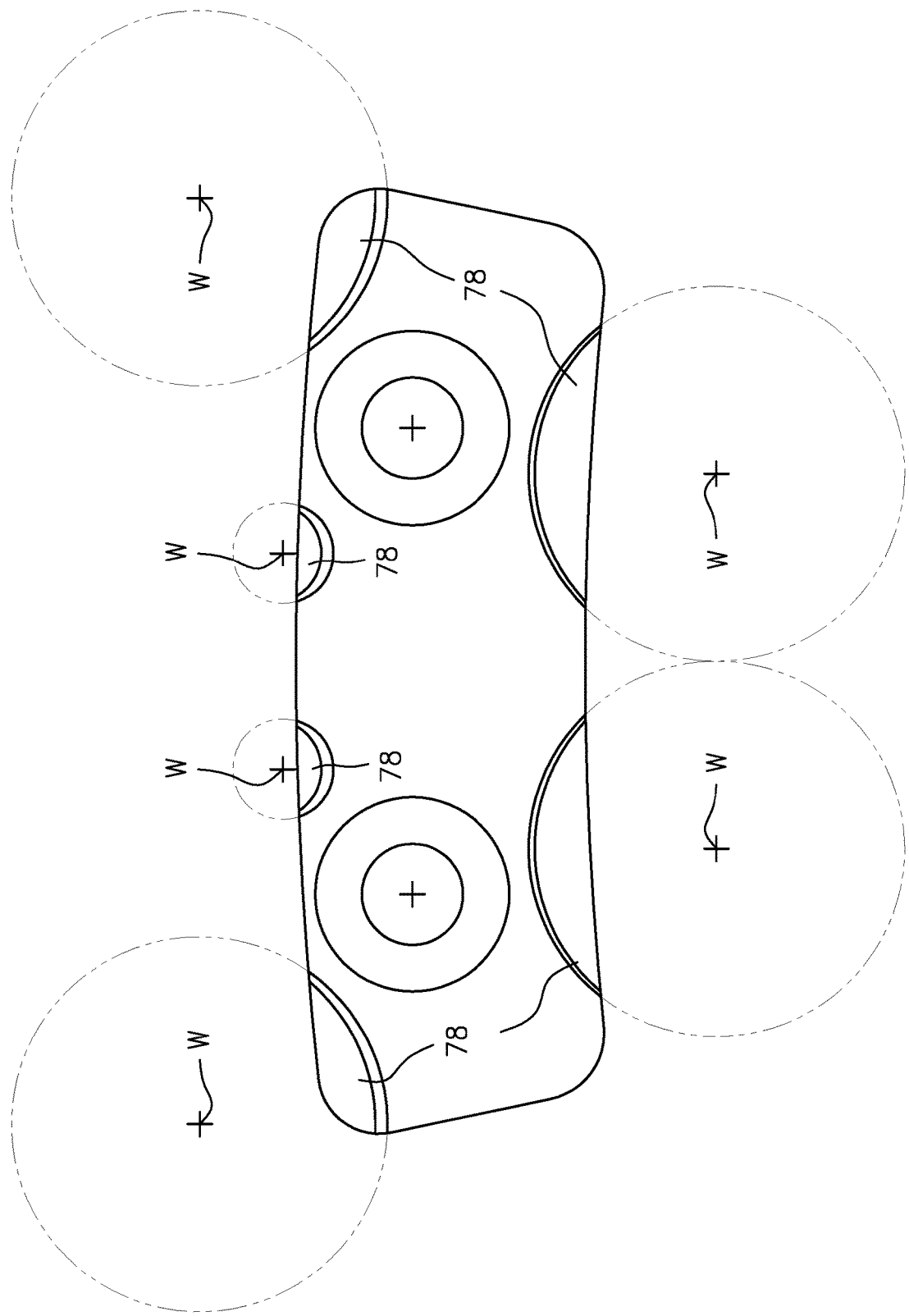
FIG. 5 is a front view of the turbulent air reducer assembly of FIG. 4 showing example vibe tune features machined therein.

With reference to FIG. 5, the vibe tune features 78 are utilized to tune the turbulent air reducer assembly 64 such that when the turbulent air reducer assembly 64 is located within each of the multiple of recesses 62, the turbulent air reducer assembly 64 has a negligible vibratory response. The vibe tune features 78 may be manufactured with standard circular machine tools which have centers W that are located outside the outer periphery of the windage cover 74. In one example, the windage cover 74 is between 0.05-0.07 inches (about 1.3-1.8 mm), more specifically, 0.06 inches (about 1.6 mm) thick sheet stock with vibe tune features machined down to between 0.02-0.05 inches (about 0.5-1.3 mm), and more particularly, 0.04 inches (about 0.9 mm) thick.

Figure 6:
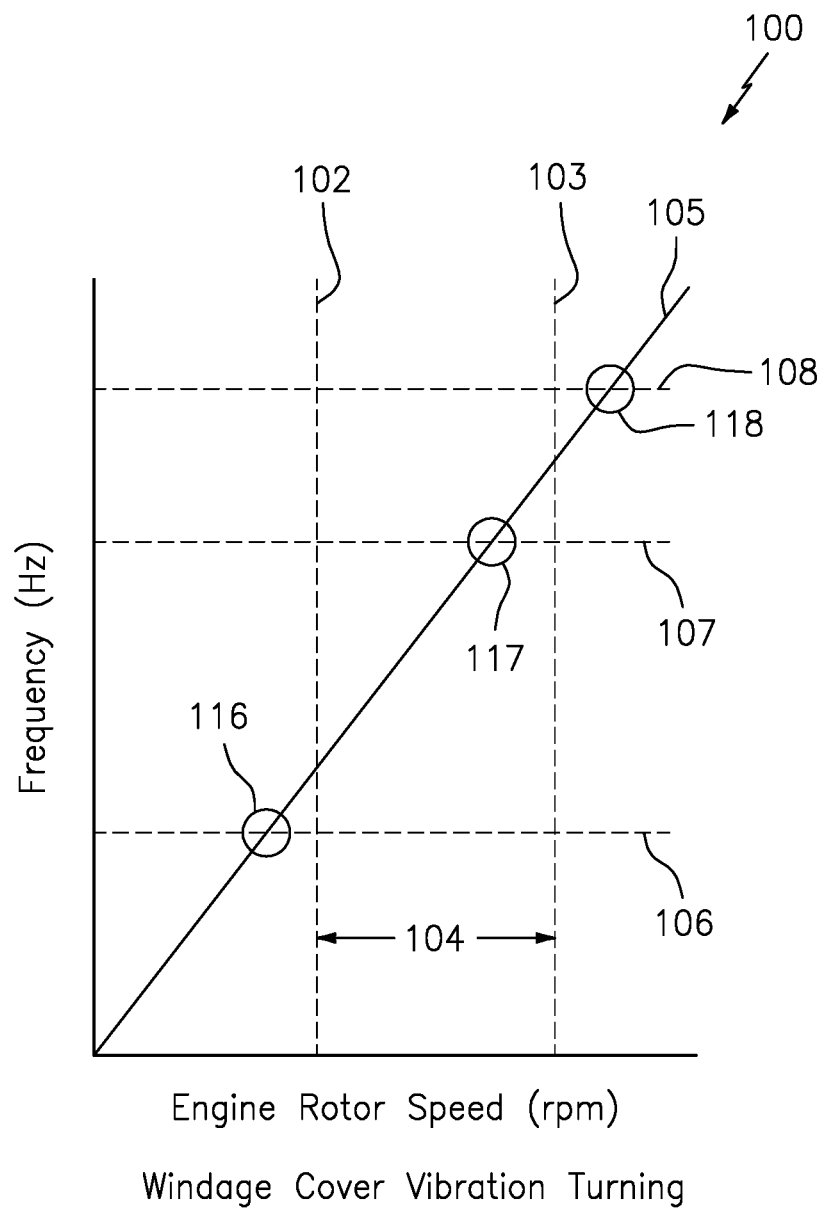
FIG. 6 is a plot for determining the vibe tune features.

With reference to FIG. 6, the vibration issues and corrective action are represented graphically in what is commonly known in industry as a Campbell, resonance, or interference diagram 100. An engine rotor speed is plotted versus frequency. The operating speed range of the turbine 20 is defined as the speed range between idle (102) and maximum speeds (103).

In the design phase, the natural frequencies of the subject part of interest are determined typically by finite element analysis. These natural frequencies for each mode are plotted as horizontal lines in the diagram (106, 107, 108). The slope or decrease in frequency of the lines (106, 107, 108) with increasing speed is the result of higher operating temperatures at higher speeds. The diagonal line (105) represents the frequency of a vibratory excitation source often caused by a periodic pressure disturbance or pulsation impinging on the part of interest. A common example in turbo-machinery are the blades on a rotor which are an excitation source for the adjacent stationary vanes and vice versa. In this case, the pressure pulses exciting the windage cover 74 are caused by a set of the uniformly spaced cover plate apertures 32 (FIG. 1). Because the excitation source is located on the rotor 22, the frequency of the excitation is linearly proportional to the speed of the rotor 22. Resonance occurs where the natural frequencies of the turbulent air reducer assembly 64 match that of the excitation source (116, 117, and 118).

In the resonance condition, when there is little to no damping, the vibratory stresses in the turbulent air reducer assembly 64 can reach levels in high cycle fatigue (HCF), potentially resulting in cracking or fracture. To avoid this, the turbulent air reducer assembly 64 is tuned by raising or lowering the natural frequencies to avoid resonances in the operating range of the engine (104). In this example, the first mode frequency (106) has been tuned to place the resonance (116) below idle where the engine spends minimal exposure time. Similarly, the third mode frequency (108) has been tuned to place the resonance (118) above maximum rotor speed, where the engine does not operate. However, the second mode frequency (107) in the example has a resonance (117) in the operating range and is therefore at risk of HCF damage unless it is tuned.

The natural frequency is proportional to the square root of the stiffness over mass. Tuning can be accomplished by adjusting the stiffness by adding thickness to the part or adding stiffening features such as ribs or other out of plane features. Tuning can also be accomplished by removing overhung mass to raise frequency. In the case of weight efficiency it is often more desirable to remove mass rather than to add material for stiffness. Tuning of the windage cover 74 is performed by removal of mass near the free edges of the part in order to raise frequencies and/or by removing mass in places where vibratory deflection is predicted. By reducing mass in specific places where motion will occur, the resonant frequencies can be significantly changed, more so than by just changing the mass of the entire part.

Figure 7:
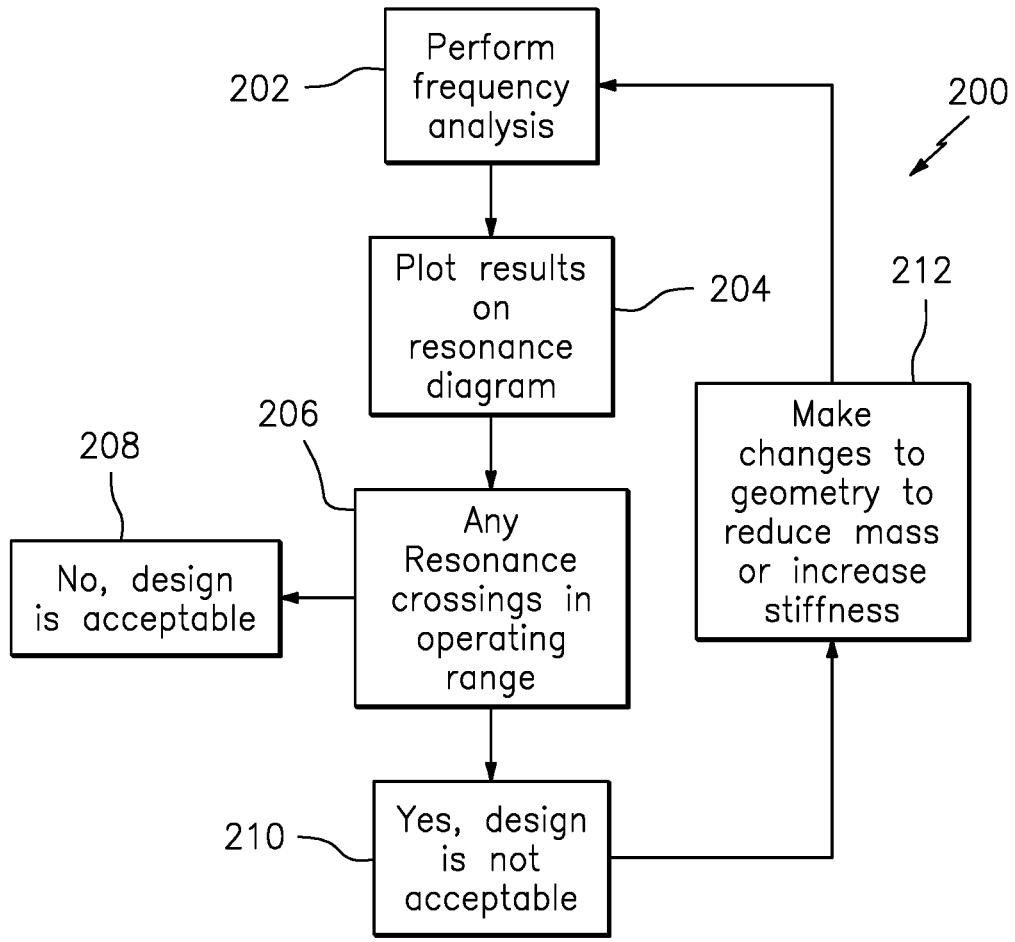
FIG. 7 is block diagram illustrating a method for determining the vibe tune features.

With reference to FIG. 7, the vibe tune features 78 are determined so that the turbulent air reducer assembly 64 is tuned to provide a desired particular vibration response from the turbine rotor. A method 200 is illustrated for the tuning process during the design phase to provide the desired particular vibration response.

The natural frequencies of the turbulent air reducer assembly 64 are calculated (step 202) then plotted (step 204) on the resonance diagram (FIG. 6). The results are then interrogated to determine if there are any resonance crossings (step 206) in the operating range (117; FIG. 6). If not, the design is acceptable (step 208). If there are resonance crossings in the operating range ((step 210) 117; FIG. 6) an iteration process (step 212) is used to modify the geometry and re-calculate the frequencies and resonance crossings until the design is acceptable. This iteration process can be done by inspecting the mode shapes that are unique to each frequency to determine where changes to stiffness or mass should be made. The process can also be automated to optimize the design by reducing or trying to equalize the modal strain energy in the analytical model.

Figure 8:
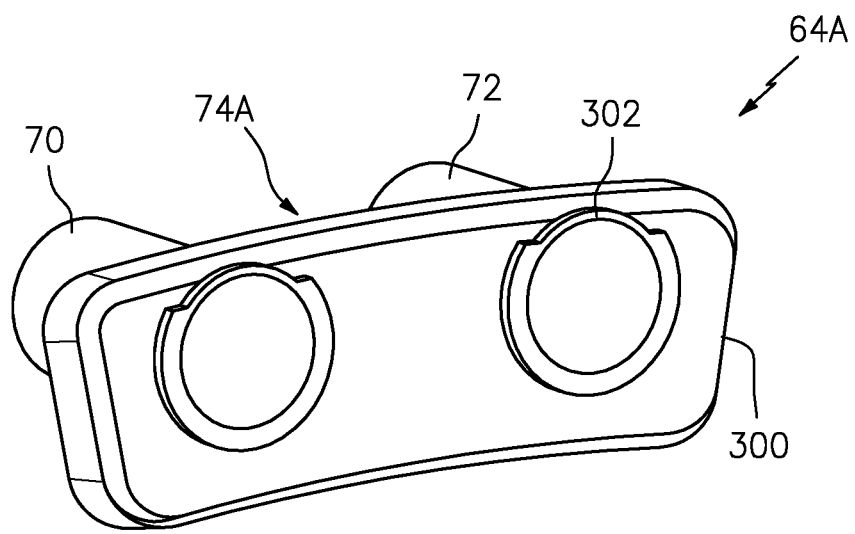
FIG. 8 is a front perspective view of the turbulent air reducer assembly according to another disclosed non-limiting embodiment.
Figure 9:
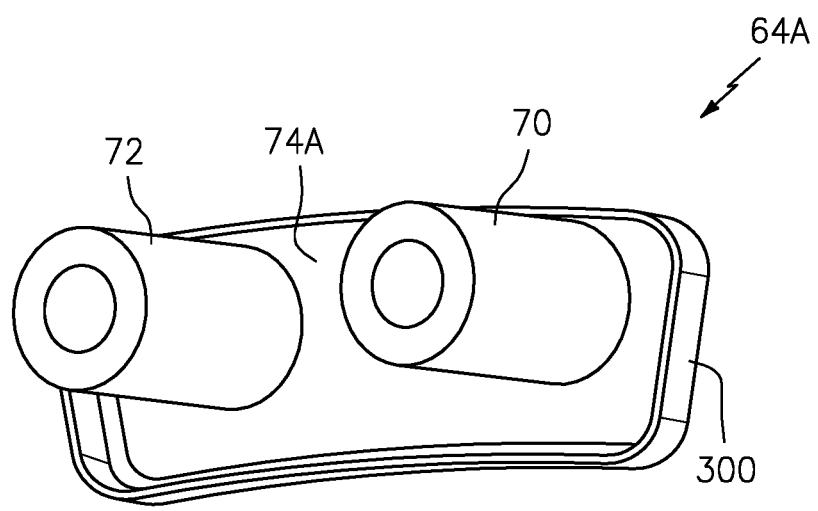
FIG. 9 is a front view of the turbulent air reducer assembly of FIG. 8.

With reference to FIGS. 8 and 9, another embodiment of the turbulent air reducer assembly 64A includes a windage cover 74A with a radiused edge 300. The radiused edge 300 is directed toward the first standoff 70 and the second standoff 72 which include segmented flanges 302 to accommodate the radiused edge 300. The segmented flanges 302 are aligned with the radiused edge 300 so as to not extend therefrom.

Figure 10:
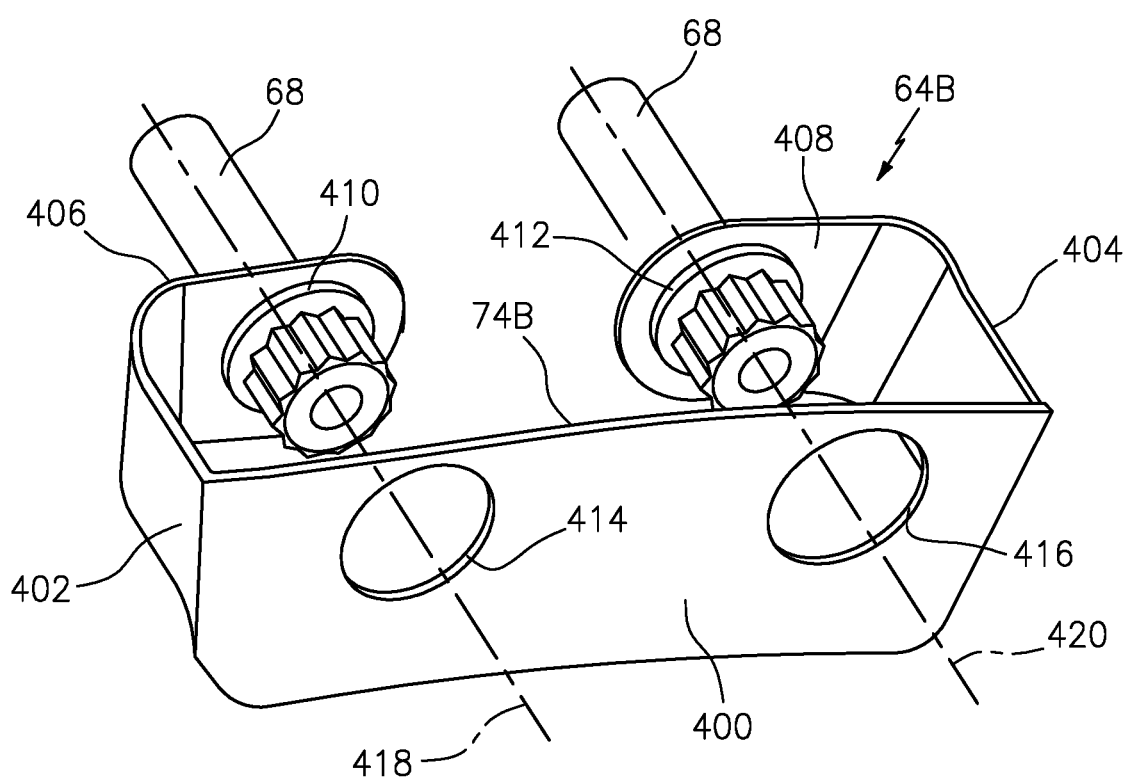
FIG. 10 is a front perspective view of the turbulent air reducer assembly according to one disclosed non-limiting embodiment.

With reference to FIG. 10, another embodiment of the turbulent air reducer assembly 64B includes a windage cover 74B with an aft side 400 and U-shaped ends 402, 404 which include respective forward side 406, 408 with apertures 410, 412 that match apertures 414, 416 in the aft side 400 along axes 418, 420 to receive the fasteners 68.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that relative positional terms such as "forward," "aft," "upper," "lower," "above," "below," and the like are with reference to the normal operational attitude of the vehicle and should not be considered otherwise limiting.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. An assembly for a gas turbine engine, comprising:
a vane support;
an on-board injector with a multiple of recesses mounted to the vane support, each of the multiple of recesses includes a first and a second aperture through a respective first and second machined surface, the on-board injector is a cast component;
a first standoff that interfaces with the first machined surface;
a second standoff that interfaces with the second machined surface;
a windage cover attached to the first standoff and the second standoff, the windage cover forms a single generally coplanar surface over each of the multiple of recesses for rotating air flow to pass thereby, the windage cover tuned to a particular vibration response related to a rotation of a turbine rotor by thinning a semi-circular area of the windage cover on a side from which the first and second standoff extends, a center of the semi-circular area located outside an outer periphery of the windage cover;

a first fastener that extends through the first standoff, the first fastener recessed within the windage cover to maintain the single coplanar surface; and a second fastener that extends through the second standoff, the second fastener recessed within the windage cover to maintain the single coplanar surface.

2. The assembly as recited in claim 1, wherein the first standoff and the second standoff comprise a flange attached to the windage cover.

3. A method for vibration tuning a component within a section of a gas turbine engine comprising the steps of:

removing an overhung mass by thinning a semi-circular area from a windage cover to tune the component to a particular vibration response related to a rotation of a turbine rotor, a center of the semi-circular area located outside an outer periphery of the windage cover.

4. The method according to claim 3, wherein removing the overhung mass comprises removing mass near a free edge.

5. The method according to claim 3, wherein the turbulent air reducer assembly is tuned by raising or lowering the natural frequencies to avoid resonances in the operating range of the engine.

6. The method according to claim 3, wherein the turbulent air reducer assembly is tuned in the first mode frequency to place the resonance below an engine idle condition.

7. The method according to claim 3, wherein the turbulent air reducer assembly is tuned in the third mode frequency to place the resonance above a maximum rotor speed where the engine does not operate.

8. The method according to claim 3, wherein the turbulent air reducer assembly is tuned in the second mode frequency that has a resonance in the operating range.

* * * * *